(12) United States Patent
Knable (10) Patent No.: US 8,087,936 B2
(45) Date of Patent: Jan. 3, 2012

(54) SYSTEMS AND METHODS FOR VERBAL COMMUNICATION FROM A SPEECH IMPAIRED INDIVIDUAL

(76) Inventor: Jason Knable, Cascade, MT (US)

(*) Notice: Subject to any disclaimer, the term of this patent is extended or adjusted under 35 U.S.C. 154(b) by 870 days.

(21) Appl. No.: 11/537,970

(22) Filed: Oct. 2, 2006

(65) Prior Publication Data

US 2007/0078878 A1 Apr. 5, 2007

Related U.S. Application Data

(60) Provisional application No. 60/723,537, filed on Oct. 3, 2005.

(51) Int. Cl.
*G09B 21/00* (2006.01)
(52) U.S. Cl. ......... 434/112; 116/17; 340/407.1; 348/62; 704/258
(58) Field of Classification Search .................. 434/263, 434/112, 116; 116/17; 348/62; 704/258
See application file for complete search history.

(56) References Cited

U.S. PATENT DOCUMENTS

| | | | |
|---|---|---|---|
| 3,651,512 A | 3/1972 | Summers | |
| 4,075,621 A | 2/1978 | Salmon | |
| 4,215,240 A | 7/1980 | Ostrowski | |
| 4,303,915 A | 12/1981 | D'Angelo et al. | |
| 4,810,996 A * | 3/1989 | Glen et al. | 340/321 |
| 5,142,655 A * | 8/1992 | Drumm | 379/52 |
| 5,169,342 A | 12/1992 | Steele et al. | |
| 5,341,291 A | 8/1994 | Roizen et al. | |
| 5,841,373 A | 11/1998 | Mason | |
| 6,339,410 B1 | 1/2002 | Milner et al. | |
| 6,551,103 B2 | 4/2003 | Gottfried | |
| 6,554,619 B2 | 4/2003 | Williams | |
| 2002/0140561 A1 | 10/2002 | Baxter | |
| 2004/0007907 A1 * | 1/2004 | DiRe | 297/217.3 |
| 2004/0030531 A1 * | 2/2004 | Miller et al. | 702/182 |
| 2007/0078655 A1 * | 4/2007 | Semkow et al. | 704/258 |
| 2009/0247245 A1 * | 10/2009 | Strawn et al. | 455/575.2 |

FOREIGN PATENT DOCUMENTS

JP 2005066021 3/2005

* cited by examiner

*Primary Examiner* — Xuan M. Thai
*Assistant Examiner* — Banafsheh Hadizonooz
(74) *Attorney, Agent, or Firm* — Knobbe Martens Olson & Bear LLP (57) ABSTRACT

An individual that is speech impaired, such as a patient in a dentist's office, is provided with means to communicate with a service provider, such as a dentist, without the individual using their own voice. In one embodiment, a computing system initiates display of user interfaces on a display device that is visible to the speech impaired individual. The speech impaired individual may then select text phrases displayed on the display device using an input device, such as a wireless remote control. The communication systems selects one or more audio files that correspond with the selected text phrases and plays the audio file(s) so that the dentist hears the audible representation of the selected text phrase, such as via a headset that is worn by the dentist. In some embodiments, the patient is further able to select one or more educational and/or entertainment media items via the user interface.

5 Claims, 9 Drawing Sheets

SYSTEMS AND METHODS FOR VERBAL COMMUNICATION FROM A SPEECH IMPAIRED INDIVIDUAL

This application claims priority under 35 U.S.C. §119(e) to U.S. Provisional Application Ser. No. 60/723,537, filed on Oct. 3, 2005, which is hereby expressly incorporated by reference in its entirety.

BACKGROUND OF THE INVENTION

1. Field of the Invention

This invention relates to systems and methods of facilitating communication. More particularly, the invention relates to systems and methods for allowing a patient to communicate with a dentist without verbal communication directly from the patient.

2. Description of the Related Art

There is currently a communication barrier between patients and dentists, due primarily to the fact that the dentist is typically working in the patient's mouth, thus making it difficult for the patient to verbally communicate with the dentist. However, technological advances in the field of dentistry have left the communication arena basically untouched. Previous studies on this subject have focused on the deterioration of the relationship between the dentist and patient and research has been performed regarding this relationship in surveys using the Dental Beliefs Survey (DBS-R) and also a revised version of the DBS-R that included ethics, communication and control. Another study has been performed using the Primary Care Assessment Survey model to measure the interpersonal relationship associated with communication, interpersonal care, contextual knowledge of the patient, and trust. These studies have indicated, among other things, that patient/dentist communication is weakening, even though technology is growing. One study confirmed that better communication can help reduce anxiety in the dental patient. Others have indicated that patient stress is reduced if the dental operatory noises are masked, or otherwise reduced. Accordingly, there is a need for improved patient/dentist communications.

SUMMARY

In one embodiment, a communication system comprises a display device for displaying a user interface comprising a plurality of textual phrases, an input device for allowing a patient to select one of the textual phrases, a database of sound files, wherein each of the textual phrases is associated with one or more of the sound files, the associated one or more sound files comprising audible representations of the respective textual phrases, a processor for selecting one or more of the sound files associated with the selected textual phrase, and a speaker positioned so that a dentist hears sounds broadcast on the speaker, wherein the selected one or more sound files associated with the selected textual phrase are broadcast on the speaker so that the dentist hears the textual phrase verbally spoken.

In another embodiment, a communication device comprises a communication module configured to transmit to a display device information associated with a user interface comprising a plurality of textual phrases and further configured to receive a selection of one of the textual phrases from an input device that is operated by a patient in an operatory. In one embodiment the communication device further comprises a database of sound files, wherein each of the textual phrases is associated with one or more of the sound files, the associated one or more sound files comprising verbal representations of the respective textual phrases, the communication module being further configured to select one or more of the sound files associated with the selected textual phrase and to initiate playing of the selected one or more sound files so that a doctor hears an audible representation of the selected textual phrase.

In another embodiment, a communication method comprises displaying a plurality of textual phrases so that they are viewable by a patient in an operatory, receiving an indication of a selected textual phrase, wherein the patient selects the textual phrase using an input device, selecting one or more sound files associated with the selected textual phrase, playing the selected one or more sound files so that an audible representation of the selected textual phrase is broadcast on a headset worn by a doctor.

In another embodiment, a communication system comprises means for displaying a plurality of textual phrases so that they are viewable by a first person that is speech impaired, means for receiving an indication of a selected textual phrase, wherein the first person selects the textual phrase using an input device, means for selecting one or more sound files associated with the selected textual phrase, means for playing the selected one or more sound files so that an audible representation of the selected textual phrase is broadcast to a second person.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

The systems and methods described herein provide an individual that is speech impaired, such as a patient in a dentist's office, with means to communicate with a service provider, such as a dentist, without the individual using their own voice. In one embodiment, a computing system initiates display of user interfaces on a display device that is visible to the speech impaired individual. The systems and methods described herein refer to communication between a dentist and a patient. However, these systems and methods may be used in other environments, such as other environments where an individual is unable to verbally speak to others. Accordingly, references herein to a dentist and a patient are for purposes of illustration and the systems and methods described herein are not limited to use only with patients and dentists.

In one embodiment a computer monitor, or other display device, may be mounted above a patient in a dentist's office. In one embodiment, the speech impaired individual is provided with a remote control, or other input device, that allows the individual to make selections on the display device. As the individual selects text phrases on the display device, or creates text phrases by selecting individual letters or words, the text phrases are verbally communicated to the service provider, such as a dentist, via a speaker or headphones, for example.

Figure 1:
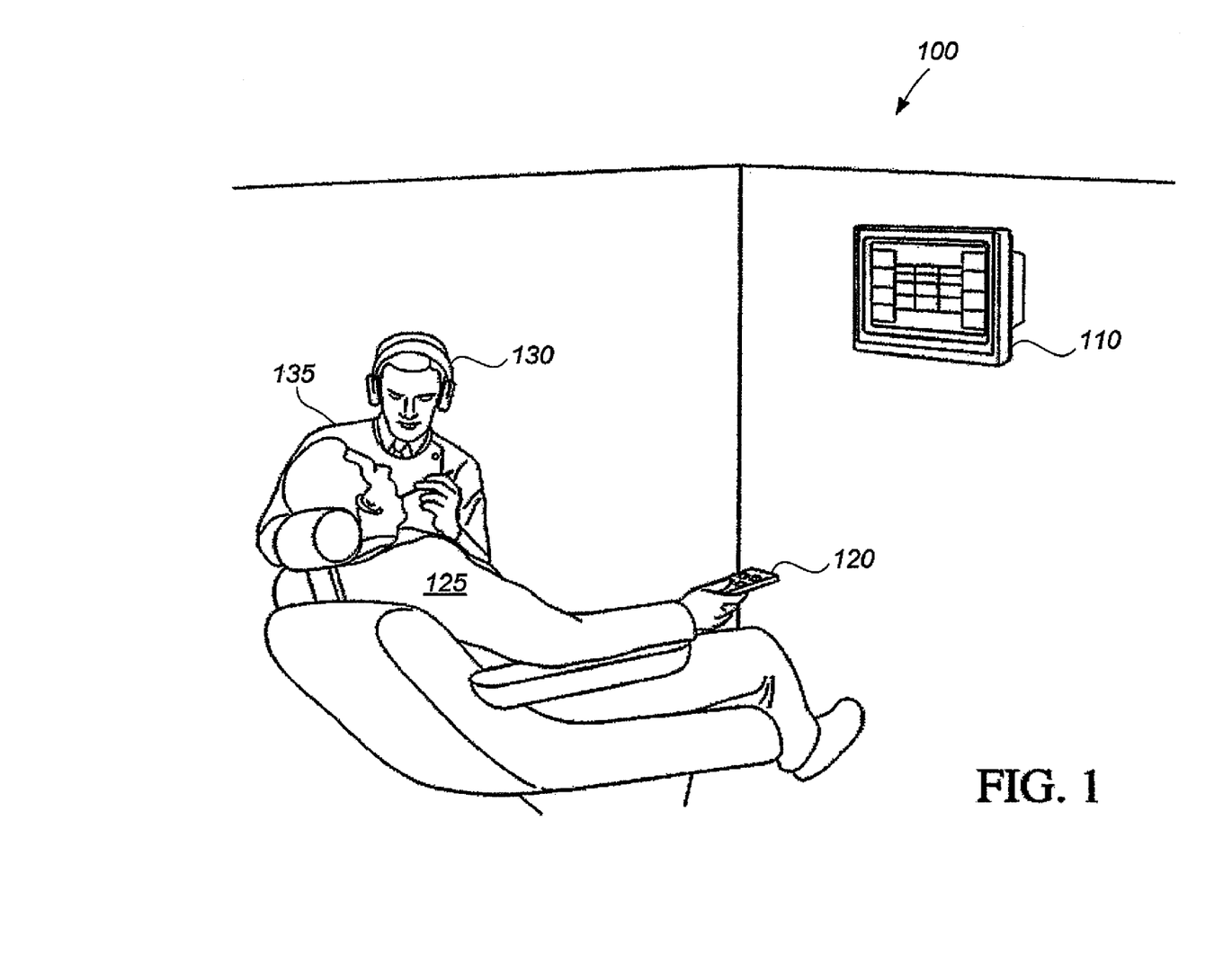
FIG. 1 is an isometric drawing of one embodiment of a communication system.

FIG. 1 is an isometric drawing of one embodiment of a communication system. In the embodiment of FIG. 1, the communication system 100 comprises a display device 110, an input device 120 that is operated by the patient 125, and a headset 130 that is worn by a dentist 135. The communication system 100 further comprises a computing device (not shown) that may be positioned proximate the display device 110 or may be remotely located. One embodiment of a computing device is described below with reference to FIG. 2. In one embodiment the computing device may by located in an adjacent room and may communicate with the display device 110 via a wired or wireless communication medium. In one embodiment, a sensor that is configured to decode wireless signals from the input device 120, such as infrared or RF signals, is positioned proximate the display device 110. The sensor may be in communication with the computing device via one or more wired or wireless connections. Similarly, the headset 130 may communicate with the computing device via a wired or wireless communication link.

In one embodiment, the display device 110 comprises a flat panel screen that is securely mounted above the patient 125 on a wall or ceiling. In other embodiments, the display device 110 may be mounted on a dental light or may comprise virtual reality devices, such as virtual reality goggles. The display device 110 may comprise any other device that is currently known or later developed that allows the patient to view a user interface provided by the computing device.

In one embodiment, the input device 120 does not require a surface to roll on. For example, the patient may use a trackball or remote control, such as the device illustrated in FIG. 3, for example, to control a cursor on the screen. In one embodiment, the interface uses a point and click navigation environment which allows the user to point with a cursor and click to navigate between different categories and click on specific answers or questions directed to the dentist. In one embodiment, the headset 130 comprises an earphone as well as a microphone. In one embodiment, the headset 130 comprises only a single speaker, thus leaving one ear of the dentist free to listen to other sounds or conversations, such as communications from a dental assistant.

In one embodiment, the patient wears headphones, such as wireless sound reducing headphones, that are also in communication with the computing device. For example, in one embodiment the patient 125 wears headphones that emit noises at frequencies and amplitudes that mask noises made by dental handpieces. These noise canceling headphones may decrease anxiety in the patient. In one embodiment, the dentist communicates with the patient 125 via a microphone that is built into the headset 130, or other microphone, that transmits the dentist's voice to the patient's headphones, such as via one or more wired and/or wireless communication links between the microphone, the computing device, and the patient's headset.

In one embodiment, multilingual support may be achieved by the patient having the option of choosing what language they want to have displayed in one or more user interfaces displayed on the display device 110. The language voiced to the dentist is also adjustable to suit the language of the dentist. This may be accomplished by the prerecorded voices being available in different languages. Accordingly, the patient 125 may select words or phrases displayed on a user interface in a first language, such as Spanish, and the selected words or phrases are verbally play to the dentist, such as on the headset 130, in a second language, such as English. Accordingly, not only does the communication system 100 provide means for a patient 125 to communicate with a dentist 130 while the dentist is treating the patient, but additionally allows for translation of words or phrases displayed on the display device 110 in a first language to verbal communication in a second language.

In certain embodiments, the communication system 200 supports dentists who use more than one operatory in their office, thus allowing the dentist to move through their operatories as they would normally and switch the communication to the patient in the current operatory. For example, in one embodiment, when the dentist moves between different operatories in the office, the dentist's headset switches between receiving stations in each of the operatories. In one embodiment, this may be done by the dentist moving a switch in the new operatory, such as by stepping on a sensor or button, that turns on the receiver in that room and turning off the receiver in the previous operatory. This reduces the need for the dentist to remove any equipment he/she is wearing, such as the headset 130 (FIG. 1), when moving between operatories. In another embodiment, the system may automatically detect when the dentist moves from one operatory to another and adjust the system so that the dentist communicates with the patient in the operatory in which the dentist is currently in.

Figure 2:
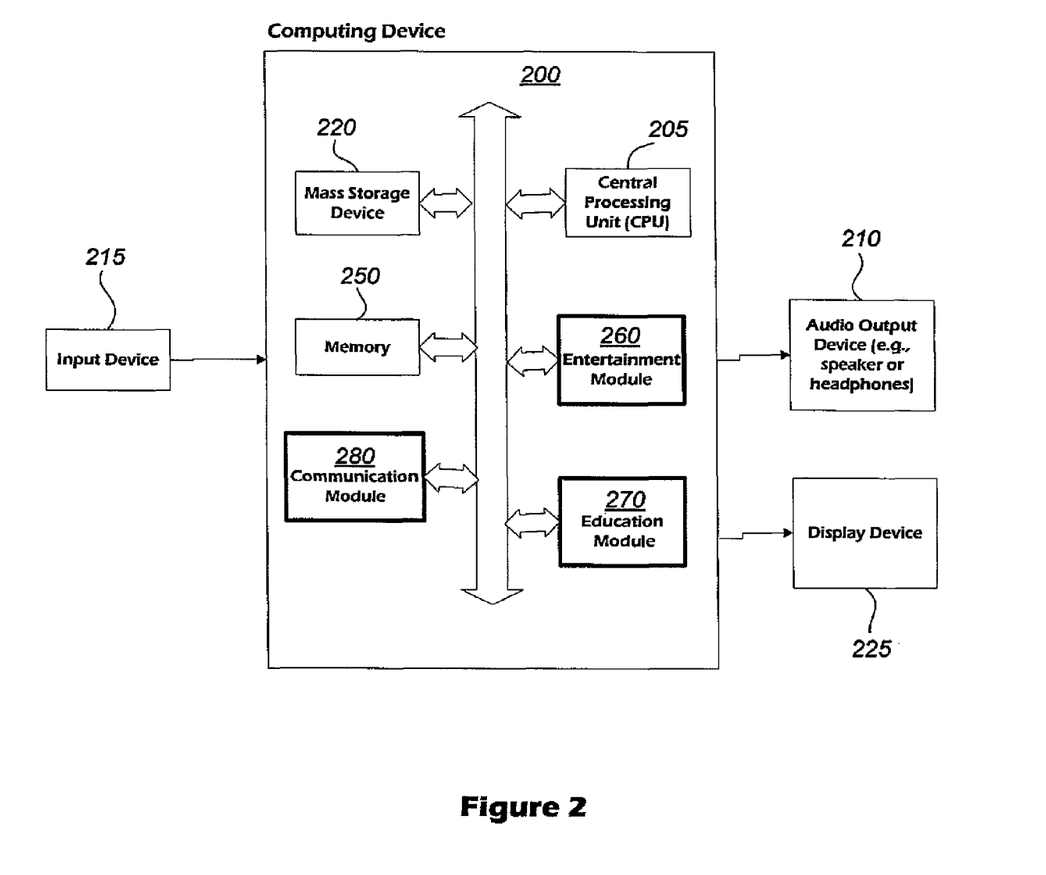
FIG. 2 is a block diagram of one embodiment of a computing system configured for facilitating communication between a patient and dentist.

FIG. 2 is a block diagram of one embodiment of a computing system 200 configured for facilitating communication between a patient and a dentist, among other functions. In different embodiments, the computing device 200 comprises a desktop computer, a laptop computer, a cell phone, a personal digital assistant, a kiosk, or an audio player, for example. The computing device 200 may be used to implement certain systems and methods described herein. For example, in one embodiment the computing device 200 may be configured to receive requests from an input device 215, such as the input device 120 of FIG. 1, and provide and/or update a user interface displayed on the display device 225, such as the display device 110 of FIG. 1. Additionally, in one embodiment the computing device 200 may output verbally spoken text phrases to the output device 210 in response to selections made by the patient using the input device 205 to control a pointer or other cursor in a user interface displayed on the display device 225. In other embodiments, the computing device 200 may also provide interfaces for the patient to select entertainment and/or education media for display on the display device 225 and/or audio output on headphones worn by the patient or one or more speakers that are positioned to be heard by the patient. The functionality provided for in the components and modules of the computing device 200 may be combined into fewer components and modules or further separated into additional components and modules. For example, the computing device 200 may comprise multiple central processing units (CPUs) 205 and mass storage devices 220, such as may be implemented in an array of servers.

In general, the word "module", as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be farther appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the computing device 200 includes, for example, a computing device that is IBM, Macintosh, or Linux/Unix compatible. In one embodiment, the exemplary computing device 200 includes one or more CPUs 205, which may each include microprocessors. The computing device 200 may further include one or more memory devices 250, such as random access memory (RAM) for temporary storage of information and/or read only memory (ROM) for permanent storage of information, and one or more mass storage devices 220, such as hard drives, diskettes, or optical media storage devices. In one embodiment, the modules of the computing device 200 are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device 200 communicate via a network, such as a local area network that may be secured.

The computing device 200 is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device 200 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary computing device 200 is in communication with one or more commonly available input/output (I/O) devices and interfaces, such as input device 215 which comprises one or more of a keyboard, mouse, trackball, drawing tablet, touchpad, remote control, and microphone, for example, and one or more output devices, such as audio output device 210 and display device 225. The computing device 200 may also communicate with one or more other multimedia devices, such as a headset that may be worn by a patient, speakers, video cards, graphics accelerators, and microphones, for example.

In the embodiment of FIG. 2, the computing device 200 also includes three application modules that may be executed by the CPU 205. More particularly, the application modules include an entertainment module 260, an education module 270, and a communication module 280, which are discussed in further detail below. Each of these application modules may include, by way of example, components, such as software components, object-oriented software components, class components and task components, processes, functions, attributes, procedures, subroutines, segments of program code, drivers, firmware, microcode circuitry, data, databases, data structures, tables, arrays, and variables. In the embodiments described herein, the computing device 200 is configured to execute the entertainment module 260, the education module 270, and/or the communication module 280, among others, in order to facilitate communication between a patient and dentist and/or to provide the patient with educational and/or entertainment media.

In general, the entertainment module 260 receives requests from the patient 125 (FIG. 1) that are selected by the patient 125 using the input device 215, such as the input device 120 illustrated in FIG. 1. In one embodiment, for example, the patient may move a cursor around a user interface that is displayed on the display device 225 in order to select a desired entertainment media. For example, in one embodiment a user interface that is displayed on the display device includes an entertainment section, listing various content that may be displayed on the display device 225 and/or heard by the patient using via speakers or headphones worn by the patient. In one embodiment, the patient is also able to choose a certain type of music or movie to be played through a speaker and/or headset worn by the patient and the display device 225. These forms of media may be linked to the dentist office's personal library of CDs and DVDs, for example. For example, music, videos, and games, may be available. In one embodiment, the content available in the entertainment section is customizable for each dental office. The office may be able to provide their own library of music, DVDs, and computer games for the patients. In one embodiment, the entertainment module 260 indexes the particular office's entertainment and/or education library.

In general, the education module 270 receives requests from the patient that are selecting by a patient using the input device 215. In one embodiment, for example, the patient may move a cursor around a user interface that is displayed on the display device 225 in order to select a desired education media. The education media may include, for example, movies or animated movies that demonstrate different dental procedures, educate the patient on other topics, and/or instruct the patient. For example, information and examples of dental procedures, such as amalgam preparation, oral health care instruction, or disease etiology, may be selected by the patient and presented to the patient via the display device 225 and/or played on one or more audio device, such as a speaker or headphones worn by the patient. In another embodiment, the dentist may select educational media for the patient. In certain embodiments, the education media includes games that are deemed educational to the patient. In one embodiment, the input device 215 allows the patient to interact with the game.

In general, the communication module 280 allows the patient to select words and/or phrases that the patient wants to communicate to the dentist, wherein after selection the communication module 280 plays at one or more corresponding audio files so that the dentist verbally hears the words and/or phrases selected by the patient. In one embodiment, the patient is presented with one or more user interfaces on the display device 225 and, using the input device 215, the patient is able to browse through different topics of conversation dealing with everything from small talk to dental related subjects. In one embodiment, the patient is able to point and click on written statements that are displayed on the screen. This results in that particular statement being voiced to the doctor through their audio output device 210. In one embodiment, the words and phrases that are displayed to the patient are customizable, such that user interfaces used in different operatories comprise different words and phrases. For example, an oral surgeon may want different phrases than a dentist. In another embodiment, multiple sets of user interfaces comprising different words and/or phrases may be stored by the computing device 200, wherein a particular set of user interfaces may be selected for use at any time. For example, a first set of user interfaces may be selected when the patient is a child and a second set of user interfaces may be selected when the patient is an adult. Thus, in this embodiment, the words and/or phrases that are presented to patients may be customizable for each patient.

In one embodiment, the audio files comprise prerecorded audio corresponding to each word and/or phrase that is displayed to the patient. These audio files may be stored on the mass storage device 220, for example, in any audio format, such as WAV, MP2, MP3, AAC, OGG VORBIS, MPC, MP3PRO, AC-3, ATRAC, WMA, QDESIGN, AMR-WB+, or any other compressed or non-compressed format. Thus, the communication module 280 performs a translation of the text selected on the display device 225 by the patient to audible speech that is broadcast to the dentist via the audio output device 210, which may comprise headphones worn by the dentist (for example, headset 130 of FIG. 1), one or more speakers, or other suitable device. In one embodiment, the audio device 210 comprises a headset including only one speaker so that the dentist's other ear is available to listen to other people and sounds in the office besides the patient. In one embodiment, the statement voiced to the doctor via the audio output device 210 is also played back to the patient via a patient headset or speaker that is mounted in the headrest, for example. This may aid in ensuring that both persons are aware that the recording played when it was supposed to.

In one embodiment, the input device 215 and/or the audio output device 210 are fabricated so that the outer surfaces of the devices may be disinfected without damaging the electric components within the devices. As those of skill in the art will appreciate, the input device 215 will pass through a number of hands during a short period of time in a dental operatory, for example. Thus, disinfection of the input device 215 may reduce the spread of germs that may cause sickness or disease in patients. Additionally, multiple doctors may use the audio output device 210, such as a headset and, therefore, cleansing and disinfection of the audio output device 210 may also be desired. Accordingly, in one embodiment the input device 215 and/or the audio output device 210 comprise water-tight containers around portions of the devices comprising electronics. For example, the remote 120 of FIG. 1 may comprise an outer plastic shell that seals the electronic components within the remote 120 from substances contacting an outer surface of the remote 120. Thus, the remote 120 may be periodically cleaned, such as daily or after each patient uses the remote 120, using an appropriate disinfectant or other cleaning supplies.

Figure 3:
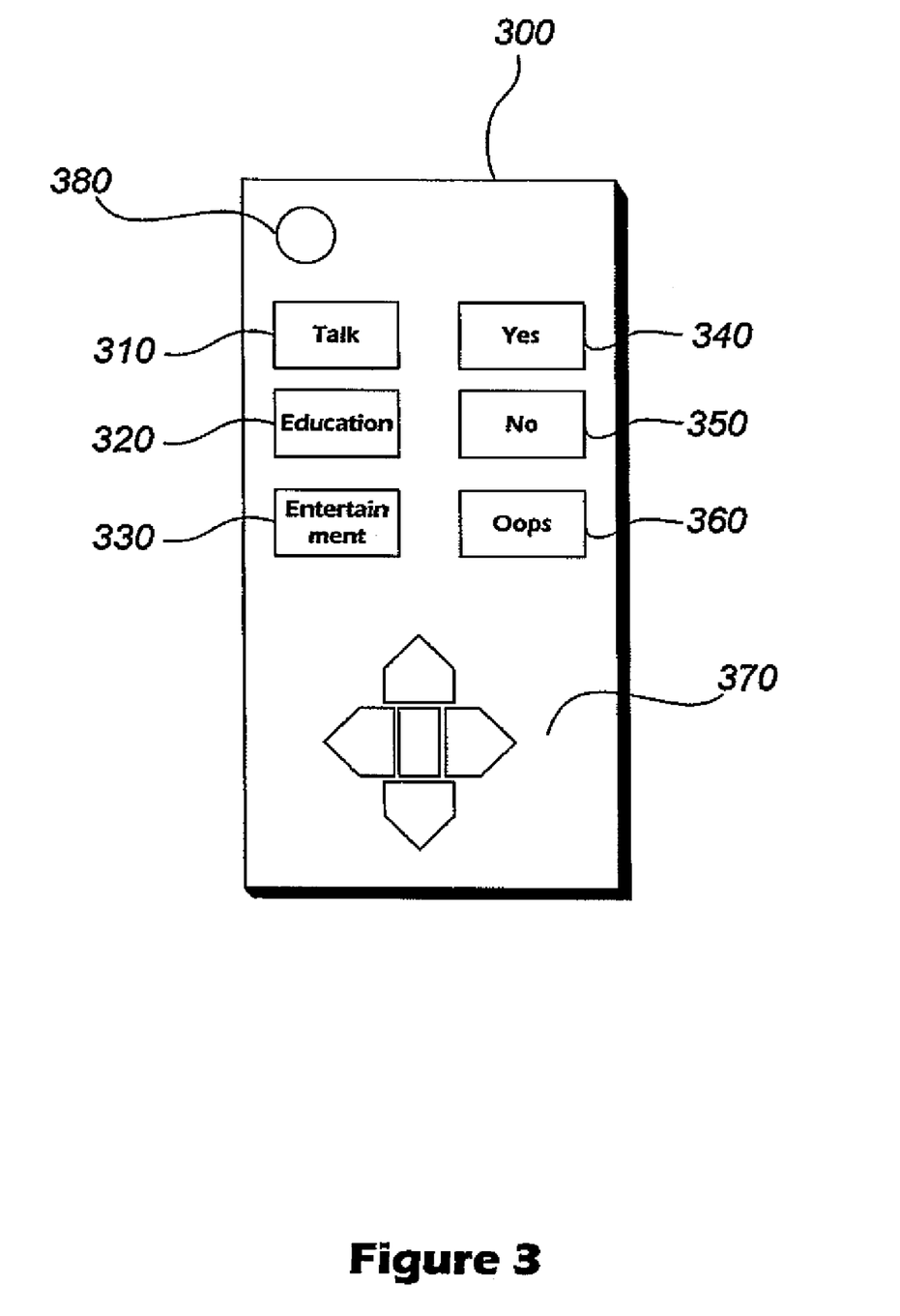
FIG. 3 is a block diagram of one embodiment of a remote control that may be used by a patient, for example, in order to initiate communication with the dentist and/or to select educational or entertainment media.

FIG. 3 is a block diagram of one embodiment of a remote control 300 that may be used as an input device 215 (FIG. 2) by a patient, for example. In one embodiment, the remote control 300 may be used by the patient in order to initiate communication with the dentist and/or to select educational or entertainment media. In the embodiment of FIG. 3, the remote control 300 comprise a power button 380 that turns the display device 225 and/or the computing device 200 on and off and navigation buttons 370 that may be used to move a cursor displayed on the display device, or in other embodiments to move from one selected item to another on the user interface. The exemplary remote control 300 further comprises a talk button 310, an education button 320, and an entertainment button 330 that are each associated with respective categories of options that are available to the patient. For example, in one embodiment if the talk button 310 is pushed, the computing device 200, and more specifically the communication module 280, presents the patient with a user interface comprising communication options on the display device 225. Likewise, if one of the education or entertainment buttons 320, 330 are pushed, the entertainment or education modules 260, 270, respectively, present a user interface comprising entertainment or education options on the display device 225.

In the embodiment of FIG. 3, the remote control 300 also comprises buttons that are associated with commonly used words that the patient may way to communicate to the dentist, generally referred to herein as "quick words." In this exemplary embodiment, the remote control 300 comprises a yes button 340, a no button 350, and an oops button 360. In one embodiment, when one of these communication buttons is selected, the text indicated on the selected button is verbally played to the dentist, such as via the audio output device 210 (FIG. 2). For example, if the yes button 340 is selected by the patient, the communication module 280 receives an indication that the yes button 340 has been pushed and selects a corresponding audio file to play on the audio output device 210, such as an MP3 file that comprises a voice speaking the word "yes." The no and oops buttons 350, 360 operate in a similar manner. In other embodiments, the text phrases on these buttons may be programmed to be associated with other words or phrases, where the words or phrases are associated with an audio file that is played on the audio output device 210 so that the dentist knows when these buttons are selected.

Figure 4:
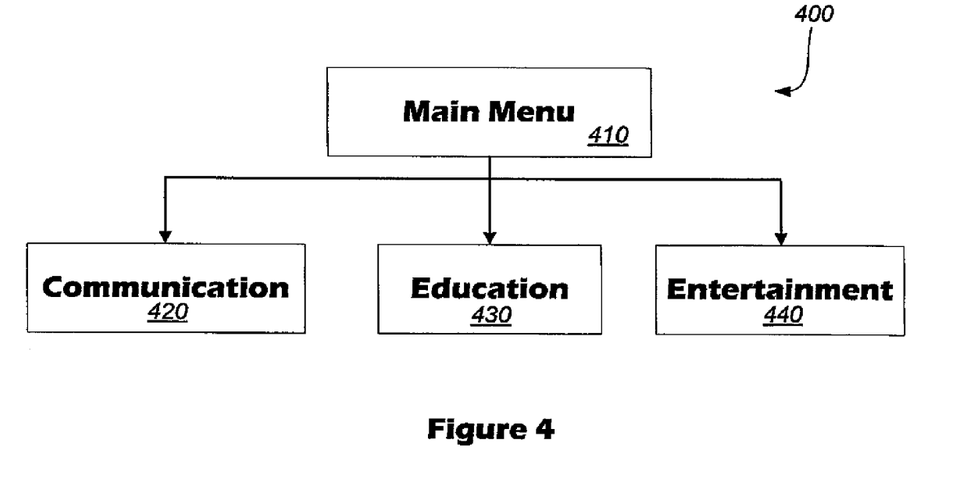
FIG. 4 is one embodiment of an organizational chart illustrating the relationship of various interfaces of exemplary communication software.

FIG. 4 is one embodiment of an organizational chart 400 illustrating the relationship of various interfaces 410, 420, 430, 440 that may be presented on the display device 225. Each of the user interfaces 410, 420, 430, 440 may comprise multiple pages, such as multiple pages of options within the user interfaces, and may include links to various other user interfaces or content that may be displayed on the display device 225. In one embodiment, multiple user interfaces may be displayed on the display device 225 concurrently. For example, in one embodiment the main menu interface 410 may comprise one or more of the communication interface 420, the education interface 430, and the entertainment interface 440. In one embodiment, each of the user interfaces comprise graphical user interfaces that are part of custom software. In another embodiment, the user interfaces comprise pages that are viewable in a browser, such as HTML or XML documents, for example. In other embodiments, the user interfaces may comprises substantially or only textual information, or may be in any other format.

In the embodiment of FIG. 400, a main menu interface 410 comprises links to user interfaces corresponding to each of a communication interface 420, an education interface 430, and an entertainment interface 440. In one embodiment, the patient may view the communication interface 420 by selecting a corresponding link or button on the main menu interface 410. Likewise, the patient may view the education or entertainment interfaces 430, 440 by selecting the corresponding link or button on the main menu interface 410. In one embodiment, the main menu interface 410 comprises a portion or all of one or more of the interfaces 420, 430, 440. For example, in one embodiment the main menu interface 410 comprises one page of the communication interface 420 illustrating text phrases that may be selected by the patient, wherein upon selection, a corresponding audio file is played to the audio output device 210. In one embodiment, the main menu interface 410 may be structured as a frame or position on one or more sides of a display device 225, such that other user interfaces may be concurrently displayed on the display device 225. For example, as discussed below with reference to FIG. 7, an interface may include links to other user interfaces, as well as textual phrases that may be spoken to the dentist via associated audio files that are played on the audio output device 210 and an entertainment interface that allows the patient to select and control entertainment media. In one embodiment, the user interfaces discussed herein, such as any one or more of the interfaces illustrated in FIGS. 4, 5, and 7-10, may comprise additional navigation links, such as forward and back buttons, that allow the patient to return to previously viewed user interfaces and then to advance to the later viewed interfaces. For example, a user may select a link associated with the education interface 430 from the main menu interface 410. While the education interface 430 is displayed to the user, a back button may be selected in order to return the user to the previously viewed user interface, which in this example is the main menu interface 410. Having returned to the main menu interface 410, the user may return forward to the education interface 430 by selecting a forward button.

Figure 5:
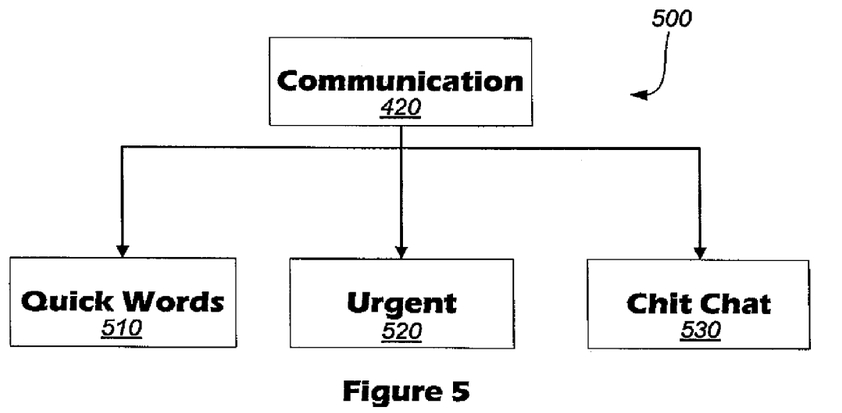
FIG. 5 is one embodiment of an organizational chart illustrating the relationship of various interfaces related to a communication segment of exemplary communication software.

FIG. 5 is one embodiment of an organizational chart illustrating the relationship of various interfaces 510, 520, 530 related to a communication interface 420. Each of the user interfaces 510, 520, 530 may comprise multiple pages, such as multiple pages of options within the user interfaces, and may include links to various other user interfaces or content that may be displayed on the display device 225. In one embodiment, each of the user interfaces comprise graphical user interfaces that are part of custom software. In another embodiment, the user interfaces comprise pages that are viewable in a browser, such as HTML or XML documents, for example. In other embodiments, the user interfaces may comprises substantially or only textual information, or may be in any other format.

In the embodiment of FIG. 500, a communication interface 420, which may be selected from the main menu interface 410 (FIG. 4), comprises links to user interfaces corresponding to each of a quick words interface 510, an urgent interface 520, and a chit chat interface 530, which is also referred to herein as a conversation interface 530. In one embodiment, the patient may view the quick words interface 510 by selecting a corresponding link or button on the communication interface 420. Likewise, the patient may view the urgent or conversation interfaces 520, 530 by selecting the corresponding link or button on the communication interface 420. In one embodiment, the communication interface 420 and/or the interfaces 510, 520, 530 may be reached directly from the main menu 410 and/or from the education or entertainment interfaces 430, 440. In one embodiment, the communication interface 420 may be partially or completely included in the main menu interface 410, such that the main menu interface 410 comprises options for selecting the quick words interface 510, the urgent interface 520, and/or the conversation interface 530. In one embodiment, the main menu interface 410 comprises the quick words interface 510. For example, in each of FIGS. 7, 8, 9, described in further detail below, a quick words interface including the words "stop", "yes", "no", and "oops", is included in each of the user interfaces. In one embodiment, the conversation interface 530 comprises text phrases that are commonly spoken to a dentist. For example, the conversation interface 530 may provide buttons, or other links, to phrase such as "what's that," "how much longer," "Can I take a break?," and/or "Can I swallow," for example. In other embodiments, the patient may select words and/or select letters in order to form words in that form phrases that are to be spoken to the dentist. In one embodiment, the words and/or phrases that are displayed to the patient are customizable, such that user interfaces used in different operatories comprise different words and/or phrases. In one embodiment, when a quick words or conversation text phrase is selected by the patient, the communication module 280 selects a corresponding one or more audio files, such as MP3 or AAC files, and plays the files so that the audio is output on the audio output device 210.

Figure 6:
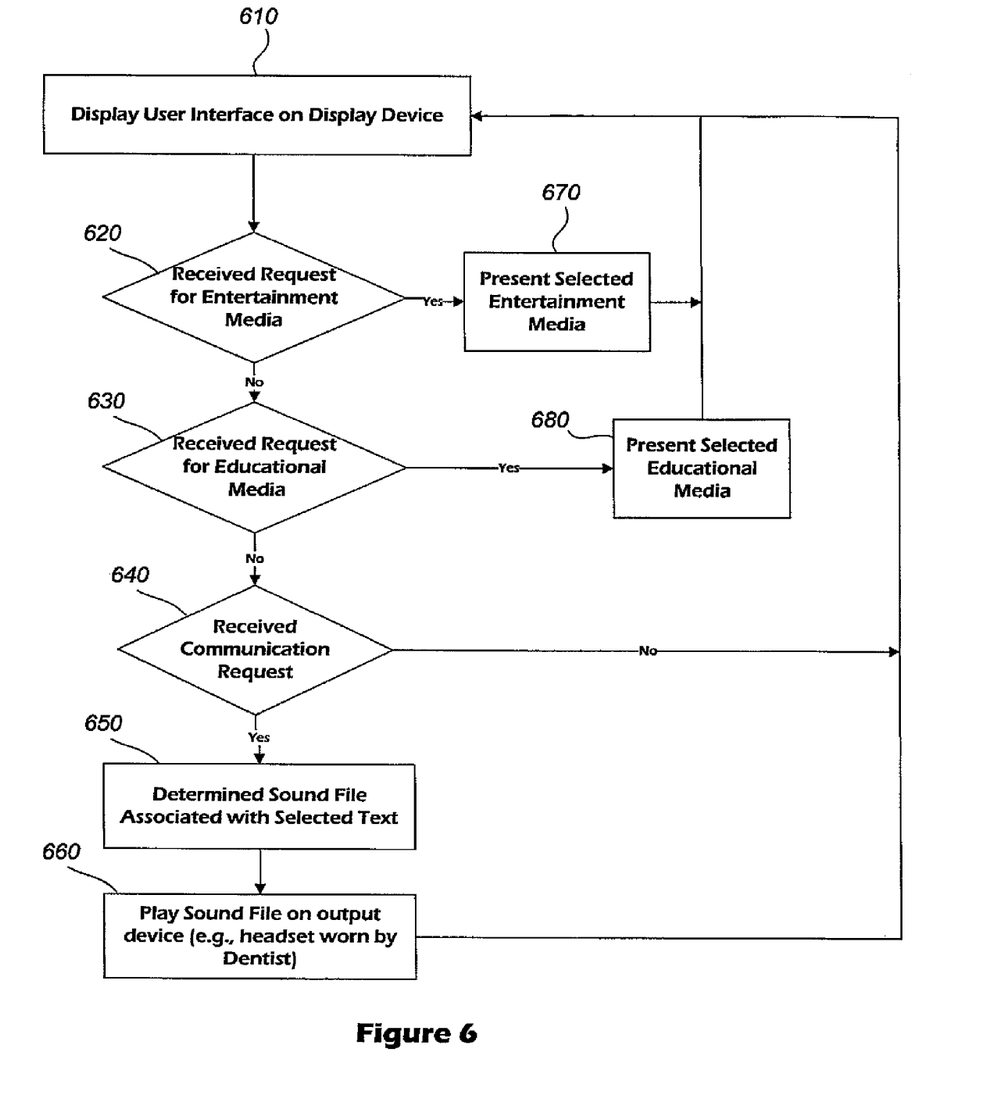
FIG. 6 is a flowchart illustrating one embodiment of a method that may be performed by the communication system of FIG. 1 in order to facilitate communication between a patient and a dentist, for example.

FIG. 6 is a flowchart illustrating one embodiment of a method that may be performed by the communication system 200 of FIG. 2 in order to facilitate communication between a patient and a dentist, for example, and/or to provide the patient with entertainment and/or educational media. Depending on the embodiment, certain of the blocks described below may be removed, others may be added, and the sequence of the blocks may be altered.

Beginning in a block 610, a user interface is displayed on a display device. In one embodiment, for example, the user interface comprises the main menu interface 410 and possibly one or more of the communication, education, and/or entertainment interfaces 420, 430, 440, or even one or more of the communication interfaces 510, 520, 530. For example, the user interface illustrated in FIG. 7 may be displayed on a display device, such as the display device 225 (FIG. 2) that is positioned so that the patient can conveniently view the display device 225.

Figure 7:
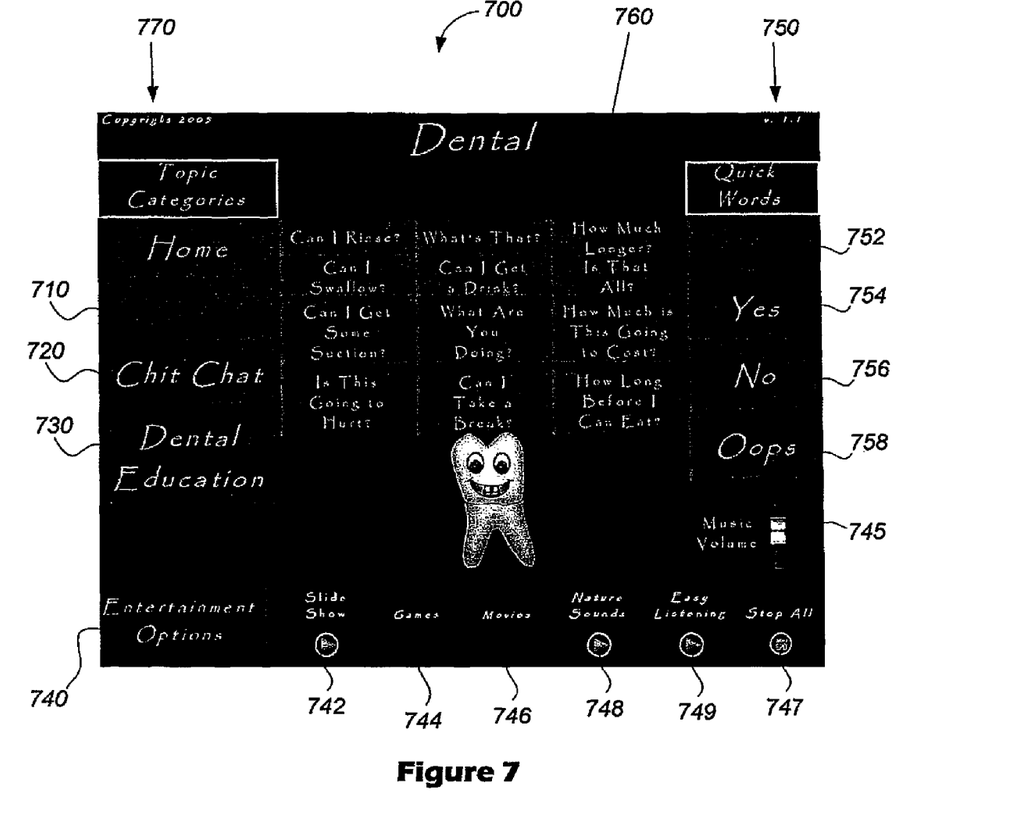
FIG. 7 is a screen shot of one embodiment of a user interface comprising a conversation interface.

FIG. 7 is a screen shot of one embodiment of a user interface 700 that may be displayed to the patient, the user interface 700 comprising a quick words interface 750, an entertainment interface 740, a topic categories user interface 770, and a conversation interface 760. As illustrated in FIG. 7, the topic categories user interface 770 comprises buttons correspond with each of a plurality of topic categories 710, 720, 730, 740. For example, the user interface 700 comprises links to additional communication user interfaces, specifically, an urgent link 710 links to an urgent interface, such as FIG. 8, for example, and a conversation link 720 links to a conversation interface 720. Additionally, the main menu user interface 700 comprises a quick words user interface 750 that includes buttons for selecting commonly used words. For example, in the embodiment of FIG. 7, the quick words interface 750 comprises a stop button 752, a yes button 754, a no button 756, and an oops button 758.

Continuing to a block 620, the computing device 200 determines if a request for entertainment media, or a request for an adjustment to a currently selected entertainment media, has been received from the patient, such as via the input device 215 (FIG. 2). For example, with reference to FIG. 7, an entertainment interface 740 is displayed at a lower portion of the screenshot. In this embodiment, the entertainment interface 740 comprises a slide show link 742, a games link 744, a movies link 746, a nature sounds link 748, an easy listening link 749, a stop all link 747, and a music volume slider 745. Selection of any link in the entertainment interface 740, for example, causes the method to continue to a block 670 where the selected entertainment media is presented. For example, if the slide show link 742 is selected, in block 670 the patient may be presented with options for the content of the slide show, the speed of the slide show, and/or music that may be played during the slide show, for example. Similarly, if the games or movies links 744, 746 are selected, in block 670 the patient may be presented with a list or directory of games or movies that may be selected. After presenting the selected entertainment media in block 670, the method returns to block 610 where the user interface comprising options for communication, entertainment, and/or education are presented to the user. For example, after the patient selects the movies link 746, selects a particular movie from a list of movies, and completes watching the movie, the method returns to block 610. In one embodiment, the entertainment media is displayed in a central portion of the user interface, between the quick words interface 750 and the topic categories interface 770 in the interface of FIG. 7, for example. In one embodiment, the selection, execution, and control of entertainment media are performed by the entertainment module 260 (FIG. 2).

Continuing to a block 630, the computing device 200 determines if a request for educational media, or a request for an adjustment to a currently selected educational media, has been received from the patient, such as via the input device 215 (FIG. 2). For example, with reference to FIG. 7, a dental education button 730 is provided and linked to a user interface that presents the patient with the available educational media. The patient may then select a desired educational media, such as a movie, slideshow, audio recording, or game, that the patient wishes to view on the display device 225 and/or hear on speakers or a headset that is worn by the patient. Selection of an educational media, such as from a user interface that may be displayed to the patient in response to selecting the dental education link 730 in FIG. 7, for example, causes the method to continue to a block 680 where the selected educational media is presented. For example, after completion of an educational movie, slideshow, or audio file that has been presented to the patient, the method returns to block 610 where the user interface comprising options for communication, entertainment, and/or education are presented to the user. For example, after the patient selects the dental education link 730 (FIG. 7), selects a particular educational media to view and/or hear from a list of available media, and completes watching and/or listening to the selected educational media, the method returns to block 610. In one embodiment, the educational media is displayed in a central portion of the user interface, between the quick words interface 750 and the topic categories interface 770 in the interface of FIG. 7, for example. In one embodiment, the selection, execution, and control of educational media are performed by the education module 270 (FIG. 2).

Moving to a block 640, the computing device 200 determines if a communication request has been received. In one embodiment, multiple user interfaces comprises words or phrases that may be selected for communication to the dentist via the audio output device 210. For example, each of the exemplary user interfaces illustrated in FIGS. 7-9 include words and/or phrases that may be selected for communication to the dentist. For example, in the embodiment of FIG. 7, a quick words interface 750 includes buttons 752, 754, 756, 758 that are each linked to words that may be commonly used in communication with a dentist.

Continuing to a block 650, after the patient has selected a word or phrase, such as by clicking on one of the buttons in the quick words interface 750 (FIG. 7) or one of the phrases in the conversation interface 760, one or more sound files associated with the selected word or phrase are determined. For example, if the patient wants to ask the doctor to take a break, the patient may navigate a pointer onto the button labeled "Can I Take a Break?" in conversation interface 760, for example, and select the button, such as by pressing a select button on a remote control or by clicking on a mouse or trackball button. Navigation of the pointer and selection of a button may be accomplished via the input device 215 (FIG. 2), which may comprise a remote control, such as the remote control 300, in one embodiment. When the button is selected, the communication module 280 selects one or more audio files associated with the selected button and outputs the audio to the audio output device 210.

In one embodiment, the mass storage device 220 (FIG. 2) comprises a plurality of audio files, such as MP3 files, that are each associated with one or more textual letters, words, or phrases. Thus, when a textual letter, word, or phrase is selected by the patient, the corresponding audio file may be selected and played by the computing device 200, outputting the audio to the audio output device 210 and possibly to a patient headset or speakers. In one embodiment, the mass storage device 220 stores a translation index file, such as a table, database, or spreadsheet file, that comprises a list of letters, words, and/or phrases, and an association for each listed letter, word, and/or phrase to one or more audio files. For example, the word "can" may be listed in the file and associated with an audio file "can.mp3". In one embodiment, all of the audio files are in a single directory on the mass storage device 200. In another embodiment, the translation index file comprises a full path location for some or all of the audio files, such as "C:/program files/gag words/audio/can.mp3" for the word "can." In other embodiments, the audio files are stored on a networked storage device that communicates with the computing device 200 via one or more wired or wireless networks.

Next, in a block 660, the determined sound file, or sound files, are played on the computing device 200 such that the audio output device plays the corresponding audio. For example, in one embodiment the communication module 280 comprises hardware and/or software configured to play the determined audio files. For example, if the sound files comprise MP3 files, the communication module 280 may comprise software that decodes and plays MP3 files. Similarly, if the sound files are in a different format, the communication module 280 may comprise software, firmware, and/or hardware that decodes and plays the sound files in the different format. In other embodiments, the sound files are transmitted to the audio output device 210, which comprises software, firmware, and/or hardware that decodes and plays the audio files. In other embodiments, another device positioned between the computing device 200 and the audio output device 210 receives the audio files and converts the audio files into audible sounds that can be played on the audio output device 210, such as a headset that is worn by the dentist. After playing the determined sound file, or sound files, the method returns to block 610 where the user interface is displayed on the display device and the user is again able to select any available media or text for communication to the dentist.

In one embodiment, the communication module 280 comprises a text-to-speech module that is configured to convert any text entered by a user, such as the patient, into speech that may be played on an output device, such as the audio output device 210. In one embodiment, the user interface 700 and/or other user interfaces that are presented to the patient on the display device 225 comprise a letter selection interface, such as a representation of a keyboard, that allows the patient to select letters in order to form words. In this embodiment, the patient may communicate to the dentist using any words that are included in the text-to-speech module library, which in one embodiment encompasses substantially all words that are used in everyday conversations. In another embodiment, the user interface 700 and/or other user interface comprises an interface that allows the user to select words from a list of commonly used words in order to form a sentence of multiple words that may be spoken to the dentist via the audio output device 210, for example. In this embodiment, rather than typing each letter of a word, the user may scroll through, or otherwise traverse, a list of commonly used words until a desired word is located. In one embodiment, the communication module 280 comprises an auto-complete module that provides the user with words that match one or more letters that have been entered by the user. For example, when the user enters the letter "c", the list of words display to the user includes only words beginning with the letter "c." At this point, the user may select a word from the list of displayed words or may continue entering letters in order to further narrow the list of displayed words. For example, if the user next enters or selects the letter "a," the displayed words are limited to words that begin with "ca." In this way, the user can often locate a desired word prior to entering each letter of the word and without scrolling through a lengthy list of available words.

Figure 8:
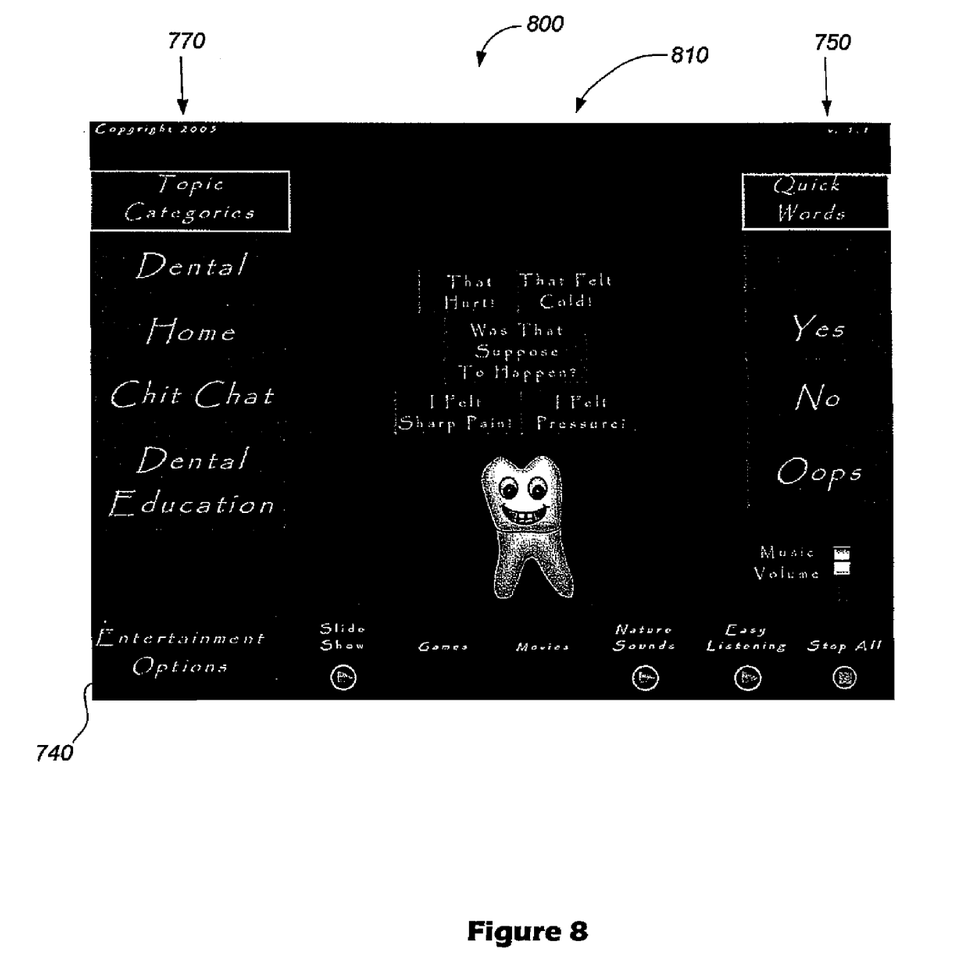
FIG. 8 is a screen shot of one embodiment of a user interface comprising an urgent interface illustrating a plurality of text phrases that may be categorized in an urgent category.

FIG. 8 is a screen shot of one embodiment of a user interface 800 that may be displayed to the patient, the user interface comprising an urgent interface 810 illustrating a plurality of urgent text phrases. Thus, in the embodiment of FIG. 8, the user interface 800 comprises the urgent interface 810, the quick words interface 750, the topic categories interface 770, and the entertainment interface 740. However, in other embodiments, the user interface may comprise more or fewer user interfaces. The exemplary urgent user interface 810 comprises multiple buttons corresponding with text phrases that a patient may want to urgently communicate to the dentist. For example, in the embodiment of FIG. 8, the urgent user interface 810 comprises five buttons, each associated with an urgent text phrase. More particularly, the urgent text phrases in the exemplary embodiment of FIG. 8 include "That hurt!", "That felt cold!", "Was that supposed to happen?", "I felt sharp pain!", and "I felt pressure!". In other embodiments, different text phrases may be included in the urgent phrases interface 810, and fewer or more buttons may be included in the interface 810.

Figure 9:
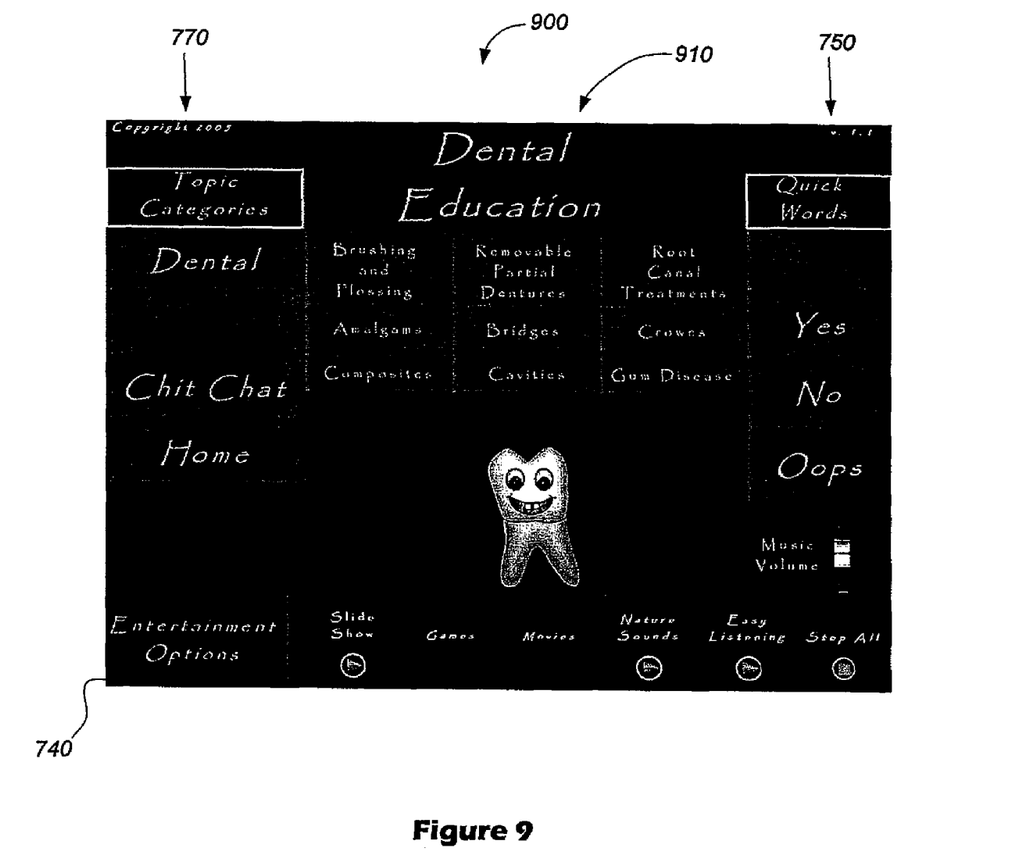
FIG. 9 is a screen shot of one embodiment of a user interface comprising an education interface illustrating a plurality of educational media items that may be selected by the patient.

FIG. 9 is a screen shot of one embodiment of a user interface 900 that may be displayed to the patient, the user interface 900 comprising an education interface 910 illustrating a plurality of educational media items that may be selected by the patient. Thus, in the embodiment of FIG. 9, the user interface 900 comprises the education interface 910, the quick words interface 750, the topic categories interface 770, and the entertainment interface 740. However, in other embodiments, the user interface 900 may comprise more or fewer user interfaces. The exemplary education user interface 910 comprises multiple buttons, each associated with a dental education topic. For example, in the exemplary education interface 910, the education topics include "brushing and flossing", "removable partial dentures", "root canal treatments", and others. Thus, by selecting the button associated with the desired dental education media, the patient will be presented with the corresponding media and/or further options related to the selected by the. In one embodiment, educational media comprises movies, such as real-life movies or cartoons, as well as computer-generated movies, such as flash-based movies, photographs, audio files that may be played to the patient, and/or games or other media types.

Figure 10:
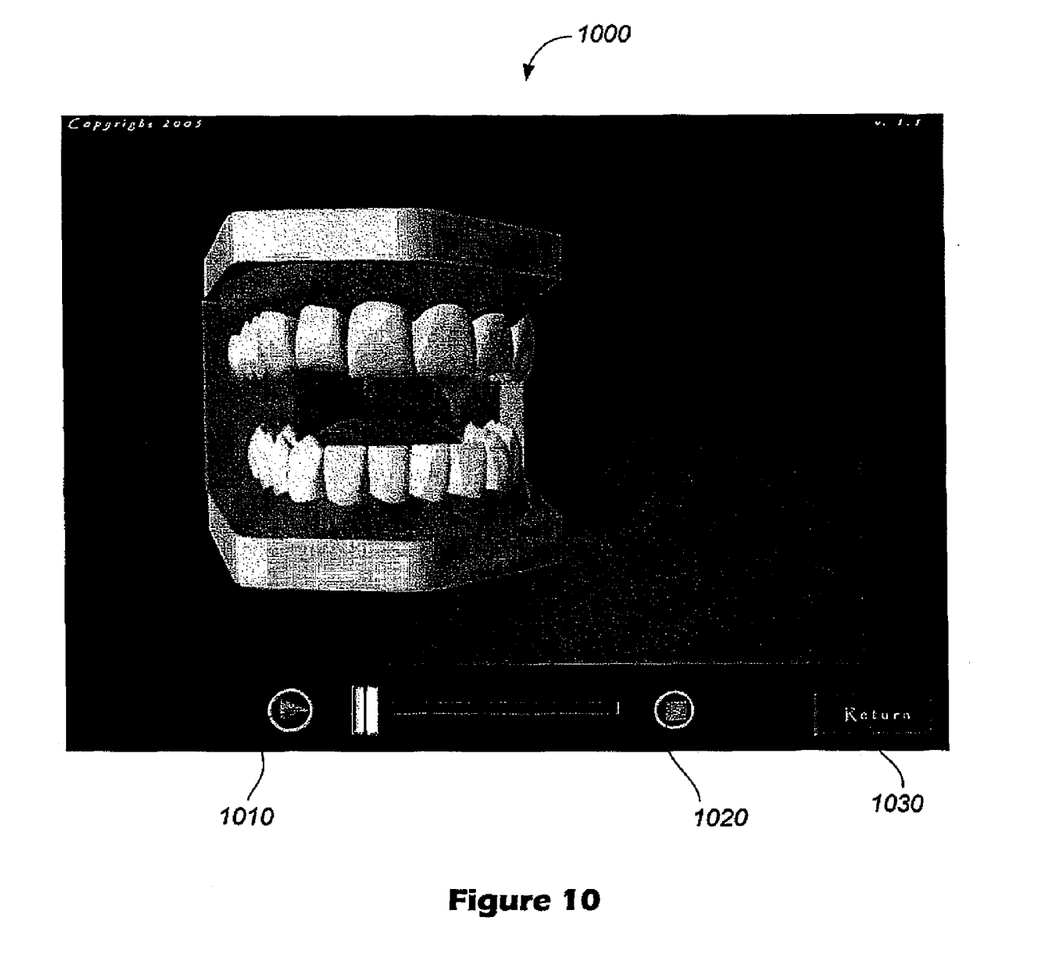
FIG. 10 is a screen shot of one embodiment of a user interface illustrating an exemplary educational media item.

FIG. 10 is a screen shot of one embodiment of a user interface 1000 that may be displayed to the patient, the user interface 1000 illustrating an exemplary educational media item. In one embodiment, the user interface 1000 may also comprise other user interfaces, such as one or more of the quick words interface 750, the topic categories interface 770, and the entertainment interface 740 illustrated in FIG. 7, for example. In other embodiments, the user interface 1000 may be displayed in full-screen mode so that the educational media is shown on the entire viewable area of the display device 225.

In the embodiment of FIG. 10, the educational media comprises a computer-generated movie, such as a movie that may be created using Macromedia Flash. In other embodiments, computer-generated movies or other animations may be created using any other available software and/or hardware. As indicated in FIG. 10, the patient may play the video by selecting a play button 1010 and may stop the video by pressing a stop button 1020. In the embodiment of FIG. 10, the user interface 1000 comprises a slider 1040 that allows the patient to select a desired location in the video stream to view. For example, the slider 1040 may be moved to the right to display later portions of the movie, and the slider 1040 may be moved to the left to display earlier portions of the movie.

In one embodiment, when the patient is done viewing the movie, a return button 1030 may be selected in order to return to a user interface that comprises additional options. For example, in one embodiment when the return button 1030 is selected, the user interface 900 including the dental education interface 910 is presented to the user on the display device 215 (For example, FIG. 2). In another embodiment, selection of the return button 1030 causes of the user interface 700 including the conversation interface 760 (For example, FIG. 7) to be displayed to the patient. In other embodiments, other user interfaces may be displayed to the patient in response to selecting the return button 1030.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A communication system for use in a dental treatment facility comprising a plurality of operatories, each of the operatories comprising a dental chair for supporting a patient, wherein a dentist moves between operatories to perform dental procedures on the patients within the respective operatories, the communication system comprising:

a plurality of display devices each adapted for positioning in one of the dental operatories so that patients in the dental operatories may view respective display devices while positioned in respective dental chairs, the display devices each displaying at least one user interface concurrently depicting a plurality of textual phrases that are commonly spoken by patients to dentists, including at least a request to rinse, a request to swallow, a Yes response, and a No response;

a plurality of input device each associated with one of the plurality of operatories, the input devices adapted for allowing patients to select textual phrases displayed on the display devices in the respective operatories;

a data structure storing a plurality of sound files, wherein each of the textual phrases is associated with one or more of the sound files, the associated one or more sound files comprising audible representations of the respective textual phrases that are prerecorded and are not in the voice of the patient;

a processor configured to execute software code in order to cause the communication system to perform operations comprising:

determining a dental operatory in which the dentist is currently positioned;

selecting from said data structure one or more of the sound files associated with a textual phrase selected by the patient, wherein the textual phrases include one or more phrases that are commonly spoken in casual conversations outside of a dental operatory; and initiating playback of the selected one or more sound files associated with the selected textual phrase on an audio headset worn by the dentist so that the dentist hears the textual phrase selected by the patient in the determined operatory verbally spoken.

2. The communication system of claim 1, wherein the input devices comprise at least a first button programmed to provide a first signal to the processor to play an audio signal on the audio headset verbally speaking "yes" without requiring a selection on the user interface, and a second button programmed to provide a second signal to the processor to play an audio signal on the audio headset verbally speaking "no" without requiring a selection on the user interface.

3. The communication system of claim 1, wherein the input devices comprise one or more of: a remote control, a keyboard, a mouse, a trackball, a drawing a tablet, and a touchpad.

4. The communication system of claim 1, wherein the user interface further displays a representation of at least one educational media item.

5. The communication system of claim 1, wherein the user interface further displays a representation of at least one entertainment media item.

* * * * *